United States Patent [19]

Seki et al.

[11] Patent Number: 5,087,642

[45] Date of Patent: Feb. 11, 1992

[54] FRICTION MATERIAL

[75] Inventors: Katsuji Seki, Saitama; Naoyuki Hashimoto, Tsukuba, both of Japan

[73] Assignees: Akebono Brake Industry Co., Ltd., Tokyo; Akebono Research and Development Centre, Ltd., Hanyu, both of Japan

[21] Appl. No.: 426,008

[22] Filed: Oct. 24, 1989

[30] Foreign Application Priority Data

Nov. 29, 1988 [JP] Japan .................. 63-299613

[51] Int. Cl.$^5$ .................................. C08J 5/14
[52] U.S. Cl. .................................. 523/156; 523/152; 523/155
[58] Field of Search ............ 523/149, 150, 152, 153, 523/155, 156, 157, 159, 200

[56] References Cited

U.S. PATENT DOCUMENTS

| | | |
|---|---|---|
| 3,835,118 | 9/1974 | Rhee et al. . |
| 3,916,062 | 10/1975 | Dougherty . |
| 3,972,394 | 8/1976 | Jacko et al. . |
| 4,125,496 | 11/1978 | McGinnis .................. 260/17.4 BB |
| 4,191,670 | 3/1980 | Strauch et al. .............. 260/23 AR |
| 4,369,263 | 1/1983 | Matsushima et al. ............. 523/152 |
| 4,374,211 | 2/1983 | Gallagher et al. . |
| 4,465,796 | 8/1984 | Leroy et al. . |
| 4,758,653 | 7/1988 | Otani et al. ...................... 528/396 |
| 4,785,029 | 11/1988 | Honma et al. ................... 523/153 |
| 4,944,373 | 7/1990 | Ohya et al. .................... 188/251 A |
| 4,954,536 | 9/1990 | Komori et al. ................... 523/149 |

Primary Examiner—Paul R. Michl
Assistant Examiner—Edward J. Cain
Attorney, Agent, or Firm—Oblon, Spivak, McClelland, Maier & Neustadt

[57] ABSTRACT

A friction material is disclosed, which is characterized in that, in the friction material comprising reinforcing material, friction modifier, solid lubricant and thermosetting organic binder, said thermosetting organic binder is a resin having less hydroxyl group content compared with phenol resin.

6 Claims, 1 Drawing Sheet

FRICTION MATERIAL

BACKGROUND OF THE INVENTION

The present invention relates to a friction material with decreased variation in friction coefficient.

The friction material such as brake pad, brake lining, clutch facing or the like used for the brake and the clutch of motorcars, railroad vehicles, industrial machines, etc. is generally made by combining and molding principal raw materials comprising reinforcing material such as asbestos, metallic fiber, iron powder or the like, friction modifier such as organic dust, metal oxide powder or the like and wear resistant solid lubricant such as graphite, molybdenum disulfide or the like with phenol resin being a thermosetting organic binder.

The friction material containing the phenol resin as a binder adsorbs, however, the moisture in atmosphere during the use because of the moisture adsorption property of phenol resin resulting in significant changes in friction and wear characteristics, which has been a problem.

As a result of investigations to solve said problem, a friction material of hardly subjected by moisture in atmosphere has been developed by the invention.

SUMMARY OF THE INVENTION

The gist of the invention lies in a friction material characterized in that, in the friction material comprising reinforcing material, friction modifier, solid lubricant and thermosetting organic binder, said thermosetting organic binder is a resin having less hydroxyl group content compared with phenol resin, wherein, as the resin containing no hydroxyl group or the resin with small content of hydroxyl group, the use of condensed polycyclic polynuclear aromatic resin or xylene resin is effective.

DETAILED DESCRIPTION OF THE INVENTION

Figure 1:
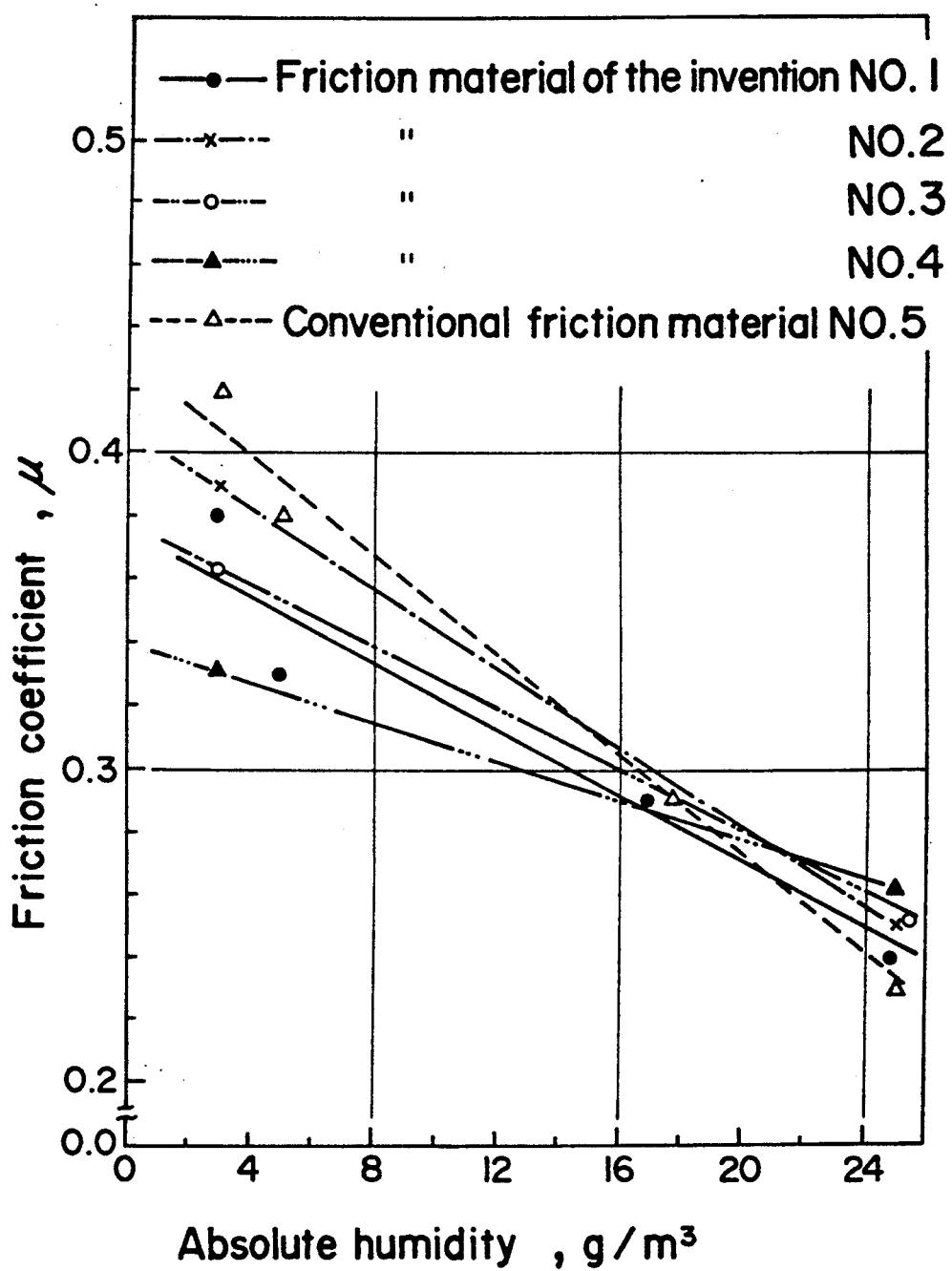
FIG. 1 is a chart showing the variation of friction coefficient according to the absolute humidity of friction materials.

The friction material of the invention can contain 10 to 50 vol. % of reinforcing material, 5 to 10 vol. % of friction modifier, 10 to 30 vol. % of solid lubricant, 5 to 20 vol. % of filler and 10 to 30 vol. % of resin containing no hydroxyl group or resin with small content of hydroxyl group.

As the reinforcing material aforementioned, one of steel fibers, brass fibers and steel fibers provided with copper coating can be used in combination with iron powder.

As the friction modifier aforementioned, one or more of rubber powder, cashew powder, alumina powder, etc. can be used.

As the solid lubricant aforementioned, graphite, molybdenum disulfide, etc. can be used.

Moreover, as the filler, barium sulfate, calcium silicate, etc. can be used.

The phenol resin being a thermosetting organic binder, which is widely used for the friction materials at present, contains a plenty of hydroxyl groups and, to these hydrophilic groups, the water molecules in atmosphere are adsorbed. Such adsorption of water molecules to hydroxyl groups is considered to be a predominant cause of changes in friction and wear characteristics of friction materials.

Hence, decreasing the hydrophilic groups of thermosetting organic binder as few as possible serves sufficiently for making the changes in friction and wear characteristics of friction materials smaller.

As the thermosetting organic binder to be used in the invention, a resin containing no hydroxyl group or having small content of hydroxyl group such as condensed polycyclic polynuclear aromatic resin or xylene resin is designated.

In following, the illustration will be made about the examples of the invention.

EXAMPLE

Respective friction materials were manufactured as described below using a condensed polycyclic polynuclear aromatic resin with a hydroxyl group content of 30% (referred to as resin B), xylene resin with a hydroxyl group content of 0% (referred to as resin C) and a condensed polycyclic polynuclear aromatic resin with a hydroxyl group content of 0% (referred to as resin D) when assuming the content of hydroxyl group of phenol resin (referred to as resin A) to be 100%.

Namely, 25 vol. % of graphite, 20 vol. % of steel fibers provided with copper coating, 20 vol. % of iron powder, 6.5 vol. % of rubber powder, 0.5 vol. % of alumina powder and 8 vol. % of barium sulfate were mixed, then 20 vol. % of resin A, B, C or D were added to this mixture, and the whole was molded under heat to produce conventional friction material No. 5 and the friction materials of the invention No. 1, No. 2 and No. 3.

Further, 20 vol. % of graphite, 20 vol. % of steel fibers, 20 vol. % of iron powder, 6.5 vol. % of rubber powder, 0.5 vol. % of alumina powder and 13 vol. % of barium sulfate were mixed and, after the addition of 20 vol. % of resin D to this mixture, the whole was molded under heat to obtain the friction material of the invention No. 4.

At this time, since acidic catalyst is used in the cases of said resins B, C and D, it is preferable to use after the surface of barium sulfate used as a filler is coated with silane coupling agent of epoxy type, chlorine type or the like or acid-treated with a solution dissolved 10% p-toluenesulfonic acid into methanol.

Next, of these friction materials No. 1 through No. 5, the friction coefficient was measured, respectively, in moistened atmosphere, the results of which are shown in FIG. 1. Moreover, the results of the calculation of final variation rate of friction coefficient are shown in Table 1.

TABLE 1

| Friction material | No. | Binder | Ratio of hydroxyl group (%) | Reduction rate in friction coefficient (%) |
|---|---|---|---|---|
| Friction material of the invention | 1 | Resin B | 30 | 56 |
| Friction material of the invention | 2 | Resin C | 0 | 58 |
| Friction material of the invention | 3 | Resin D | 0 | 44 |
| Friction material of the invention | 4 | Resin D | 0 | 27 |
| Conventional | 5 | Resin | 100 | 83 |

TABLE 1-continued

| Friction material | No. | Binder | Ratio of hydroxyl group (%) | Reduction rate in friction coefficient (%) |
|---|---|---|---|---|
| friction material | | A | | |

As shown, with the conventional friction material No. 5 used phenol resin as a thermosetting organic binder, the friction coefficient was decreased by 83% in moistened atmosphere. In comparison with this, the decrease in the friction coefficient of friction materials of the invention No. 1, No. 2, No. 3 and No. 4 used condensed polycyclic polynuclear aromatic resin or xylene resin as thermosetting organic binder was only 27 to 58% or so.

As described above, the friction material, wherein the hydrophilic groups of thermosetting resin were decreased as few as possible, has conspicuous effects that the stabilized friction characteristics can be exhibited and the like, since it is hardly effected by the amount of moisture in atmosphere, that is, the humidity even if this may change.

What is claimed is:

1. A friction material comprising 10-50 vol. % of reinforcing material selected from the group consisting of metal fiber, metal powder and mixtures thereof, 5-10% vol. % of friction modifier selected from the group consisting of rubber dust, cashew dust, alumina powder and mixtures thereof, 10-30 vol. % of solid lubricant selected from the group consisting of graphite, molybdenum disulfide and mixtures thereof, 5-20 vol. % of filler made of basic material selected from the group consisting of barium sulfate, calcium silicate and mixtures thereof and 10-30 vol. % of binder made of thermosetting resin selected from the group consisting of a condensed polycyclic polynuclear resin and a xylene resin, the hydroxyl group content of which is lower than that of phenol resin and the curing reaction of which proceeds by means of an acidic catalyst, and wherein said filler made of basic material is coated with a coupling agent or treated with acid on the surface thereof so as to avoid hindering the curing reaction of said thermosetting resin.

2. The friction material of claim 1, wherein the hydroxyl group content of the thermosetting resin is 0-30% on the basis that the hydroxyl group content of phenol resin is 100%.

3. The friction material of claim 1, wherein the thermosetting resin is a condensed polycyclic polynuclear aromatic resin.

4. The friction material of claim 1, wherein the thermosetting resin is a xylene resin.

5. The friction material of claim 1, wherein the filler is barium sulfate the surface of which is coated with a silane coupling agent.

6. The friction material of claim 1, wherein the filler material is barium sulfate which is subjected to acid-treatment with a solution of 10% p-toluene sulfonic acid dissolved in methanol.

* * * * *